UNITED STATES PATENT OFFICE.

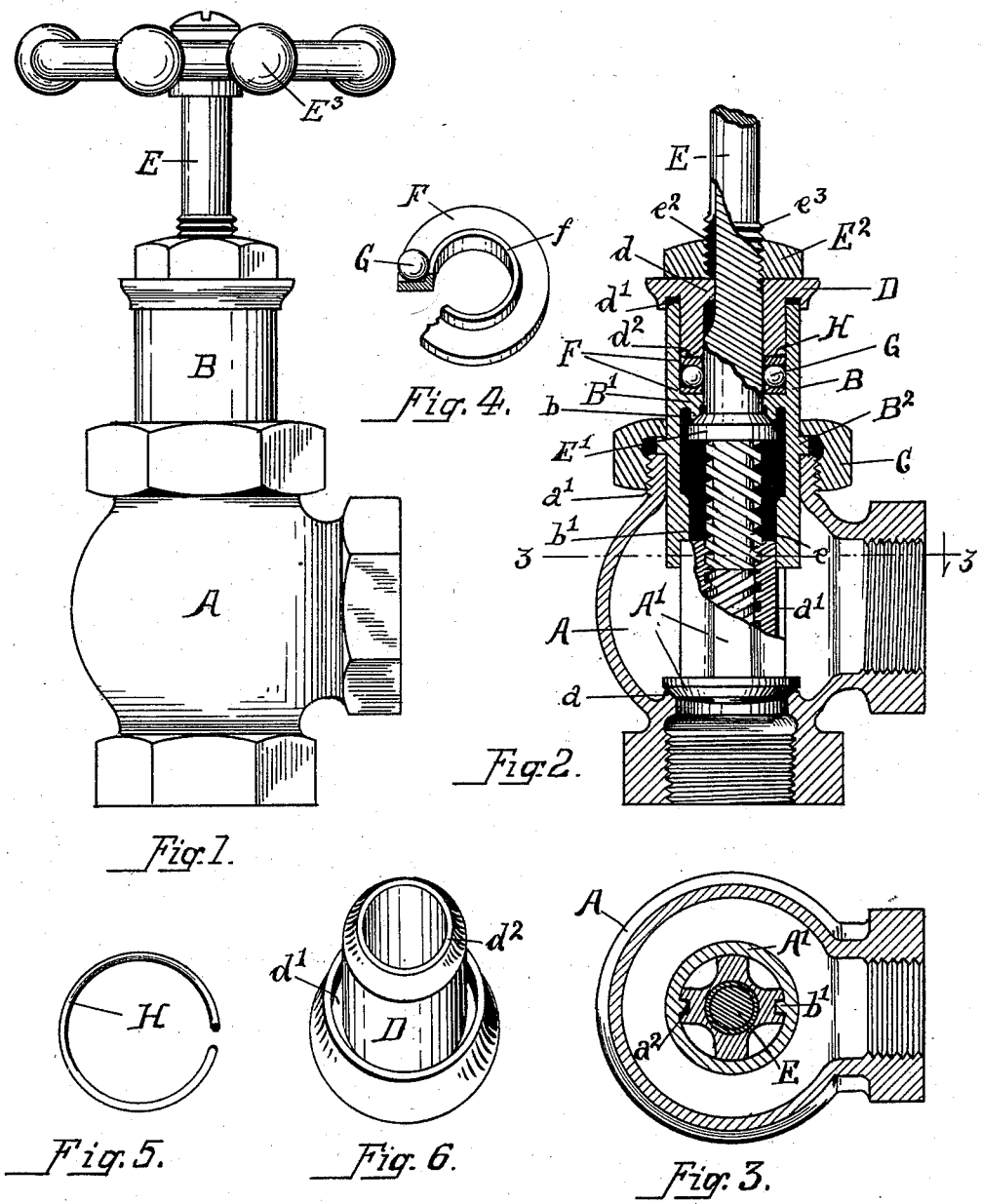

JAMES L. COOK, OF SPRINGFIELD, ILLINOIS.

VALVE.

SPECIFICATION forming part of Letters Patent No. 580,930, dated April 20, 1897.

Application filed June 22, 1896. Serial No. 596,560. (No model.)

*To all whom it may concern:*

Be it known that I, JAMES L. COOK, a citizen of the United States, residing at Springfield, in the county of Sangamon and State of Illinois, have invented certain new and useful Improvements in Valves, of which the following is such a full, clear, and exact description as will enable those skilled in the art to which it appertains to make and use my said invention.

My invention relates, primarily, to steam-valves of that class which employ antifriction-balls surrounding the valve-stem in the valve-bonnet.

It relates also to that class of valves which are known as "packingless" valves and which do not employ packing around the valve-stem, but it obviously may be applied to valves of other kinds.

The invention herein set forth is a modification and improvement of that shown and described in a former application made by me for Letters Patent for an improvement in valves, Serial No. 578,415, filed February 7, 1896.

The purposes of my invention are to provide simple and effective means adapted to retain the balls in position in the valve-bonnet, so that when the valve-stem is withdrawn from the valve-bonnet the balls may not fall out; to provide a cap for the valve-bonnet adapted to turn with the valve-stem and a nut connecting said cap with the valve-stem, said cap and nut being so constructed and arranged that in case that part of the valve-stem contiguous to the nut becomes bent the turning of the stem cannot act to loosen the nut; to provide a valve-bonnet adapted to be connected with the valve-body by a union or ring coupling, so as to form a steam-tight joint, and to provide a valve so constructed and arranged that the valve in the valve-body may conveniently be reground on its seat.

With these ends in view my invention consists in certain novel features of construction and combinations of parts shown in the annexed drawings and hereinafter particularly described and claimed.

Referring to the drawings, Figure 1 is a side elevation of the valve. Fig. 2 is a vertical longitudinal section on the axis of the valve. Fig. 3 is a horizontal transverse section through the valve on the line 3 of Fig. 2. Fig. 4 is an enlarged detached combined perspective and sectional view of one of the keepers which serve to prevent accidental displacement of the balls in the valve-bonnet. Fig. 5 is an enlarged detached perspective view of the spring-ring which serves to retain the keepers in position in the valve-bonnet. Fig. 6 is an enlarged detached perspective view of the cap of the valve-bonnet.

Similar letters of reference designate like parts in all of the views.

The valve-body A, which may be of any convenient or suitable form, has an internal raised valve-seat $a$, and the upper end of the valve-body is screw-threaded, as shown at $a'$. The valve-bonnet B is cylindrical in form and has an internal diaphragm $B'$ and an integral peripheral ledge $B^2$. The upper surface of the valve-body A and the lower surface of the ledge $B^2$ are ground true, so as to form a steam-tight joint. On the under side of the diaphragm $B'$ is an integral annular downwardly-extending seat $b$. The union-ring C, the form of which is clearly shown in the drawings, is internally screw-threaded and screws onto the upper end of the valve-body. On the inside of the valve-bonnet are integral longitudinal ribs $b'$, which serve to guide the valve $A'$, as hereinafter explained.

The union-ring C, the form of which is clearly shown in the drawings, is internally screw-threaded and screws onto the upper end of the valve-body and serves to connect the valve-bonnet with the valve-body in an obvious manner.

The cap D is pierced by a central hole in which the valve-stem fits loosely and has an integral lug $d$, which fits loosely in a channel in the valve-stem and serves to connect the cap with the valve-stem, so that the cap will turn with the stem. In the cap D is an annular channel $d'$, in which the upper end of the valve-bonnet fits in such manner that the cap incloses and turns on the upper end of the valve-bonnet. The cap also has at its lower end an integral annular extension $d^2$, which when the cap is in place on the valve-bonnet extends down inside of the spring-ring and bears on the upper surface of the top keeper.

The valve $A'$ fits on the seat $a$ and has a female screw in which a male screw on the lower part of the valve-stem fits. The hub $a'$ of the valve A' is in transverse section approximately cross-shaped, as shown in Fig. 3, and in two of the arms of the cross are channels $a^2$, in which the ribs $b'$ on the inside of the valve-bonnet fit loosely, so as to guide the movement of the valve A'.

The stem E has at its lower end a screw $e$, fitting in a female screw in the valve A'. On the stem E above the screw $e$ is an integral disk E'.

In the valve-stem is a longitudinal channel $e^2$, in which the lug $d$ on the cap D fits in such manner that the cap will turn with the stem and in such manner also that the oil for lubricating the parts in the cavity in the valve-body above the diaphragm may be introduced through the channel. The stem E also has a screw-threaded part $e^3$, on which a nut $E^2$ fits. The nut $E^2$ bears on the upper surface of the cap D and serves to regulate the seating of the disk E' on the seat $b$.

The hand-wheel $E^3$ may be secured to the stem E in any suitable and convenient manner.

The two keepers F, which are exactly alike, are rings, preferably of steel, which fit loosely in the cavity in the upper end of the valve-bonnet and each has an integral annular ledge $f$. Antifriction-balls G, housed in the cavity in the upper end of the valve-bonnet and between the keepers F, surround the valve-stem and contact with the surfaces of the keepers. The ledges $f$ on the keepers F are of such form that they serve to prevent the balls from escaping from between the keepers when the valve-stem is withdrawn.

The ring H, which may be of spring-steel or spring-brass, fits and binds in the cavity in the valve-bonnet above the upper keeper F and is sufficiently rigid to normally retain the upper keeper in position, but may be compressed and withdrawn when it is desired to remove the keepers and the balls.

I will now describe the method by which I am enabled to grind the valve A' on its seat $a$.

First the stem is turned so as to cause the upper end of the hub $a'$ of the valve A' to bind against the under side of the disk E' with sufficient force to hold the valve A' firmly and prevent unscrewing during the operation of regrinding. The union-ring C is then unscrewed, so as to permit free rotation of the valve-bonnet and the withdrawal of the valve A' for the purpose of permitting emery-powder or other grinding material to be applied on the valve. The nut $E^2$ is then unscrewed, so as to permit the valve-stem and the connected parts to drop down until the valve A' rests on its seat $a$. Grinding material is then applied to the lower end of the valve A', and the valve-stem is turned with sufficient pressure to cause the valve to grind on its seat, but not with sufficient force to cause the stem to turn in the valve A'.

Having fully described my invention, what I claim as new, and desire to secure by Letters Patent, is—

1. A ball-keeper for valves consisting of a ring having a ledge, in combination with a valve having a cavity in its bonnet in which said keeper fits, a rotatable valve-stem operating a valve in the valve-body, balls surrounding the valve-stem in the cavity in the valve-bonnet and contacting with said keeper and a spring fitting in said cavity above said keeper, as set forth.

2. A valve-cap having a central hole in which the valve-stem fits and a lug projecting inwardly in said hole, also having an annular channel in which the upper end of the valve-bonnet fits, in combination with a valve-body, a valve-bonnet connected with said valve-body and having an internal diaphragm provided with a downwardly-extending seat, a valve within the valve-body, a channeled valve-stem passing through said valve-cap and operating the valve in the valve-body said valve-stem also having a disk seating upwardly on the seat on the diaphragm in the valve-bonnet, and a nut screwing on said valve-stem and bearing on the upper surface of said valve-cap, as set forth.

3. In a valve the combination of a valve-body, a valve within the valve-body, a valve-bonnet connected with the valve-body and having a diaphragm provided with a downwardly-extending seat, a channeled valve-stem operating the valve in the valve-bonnet and provided with a disk seating upwardly on the seat in the valve-bonnet, a valve-cap having a channel in which the upper end of the valve-bonnet fits and having a lug fitting in the channel in the valve-stem and a nut on the valve-stem bearing on the top of said valve-cap, as set forth.

4. In a valve the combination of a valve-body, a valve-bonnet connected with the valve-body and having a diaphragm provided with a downwardly-extending seat, a valve slidable in the valve-bonnet and seating on a seat in the valve-body, a valve-stem operating said slidable valve and provided with a disk seating on the seat in the valve-bonnet, keepers surrounding the valve-stem in the valve-bonnet, balls between said keepers and in contact with said valve-stem, a spring-ring retaining said keepers in the valve-bonnet, a valve-cap connected to and turning with the valve-stem and bearing on the upper keeper and a nut on the valve-stem bearing on said cap, as set forth.

5. In a valve the combination of a valve-body provided with an internal seat, a valve-bonnet having a peripheral ledge seating on the valve-body also having a diaphragm provided with a downwardly-extending seat, a union-ring connecting the valve-bonnet with the valve-body, a valve slidable in the valve-bonnet and seating on the seat in the valve-body, a channeled valve-stem operating the slidable valve and having a disk seating on the seat in the valve-bonnet, a cap having an annular channel in which the upper end of the valve-bonnet fits also having a lug fitting in the channel in the valve-stem, keepers in the valve-bonnet, balls between said keepers, a spring-ring retaining said keepers in the valve-bonnet, and a nut on the valve-stem bearing on said cap, as set forth.

In witness whereof I have hereunto subscribed, at Springfield, Illinois, this 10th day of June, 1896.

JAMES L. COOK.

Witnesses:
SHELBY C. DORWIN,
HENRY BUNN.